United States Patent
Gateman et al.

(10) Patent No.: US 9,933,537 B2
(45) Date of Patent: Apr. 3, 2018

(54) METHODS AND APPARATUS FOR HANDLING OF SENSOR CAPSULES

(71) Applicant: MAGSEIS AS, Lysaker (NO)

(72) Inventors: Jan B. Gateman, Bekkestua (NO); Nils P. Gateman, Marsta (SE)

(73) Assignee: MAGSEIS AS, Lysaker (NO)

( * ) Notice: Subject to any disclaimer, the term of this patent is extended or adjusted under 35 U.S.C. 154(b) by 0 days.

(21) Appl. No.: 14/890,995

(22) PCT Filed: Jan. 16, 2014

(86) PCT No.: PCT/NO2014/050008
§ 371 (c)(1),
(2) Date: Nov. 13, 2015

(87) PCT Pub. No.: WO2014/185787
PCT Pub. Date: Nov. 20, 2014

(65) Prior Publication Data
US 2016/0109602 A1 Apr. 21, 2016

(30) Foreign Application Priority Data
May 14, 2013 (NO) .................................... 20130680

(51) Int. Cl.
*G01V 1/38* (2006.01)
*G01V 1/18* (2006.01)

(52) U.S. Cl.
CPC ............ *G01V 1/3852* (2013.01); *G01V 1/186* (2013.01)

(58) Field of Classification Search
CPC .......... H01R 4/22; H01R 4/2458; H01R 4/64; H01R 4/643

(Continued)

(56) References Cited

U.S. PATENT DOCUMENTS

| 4,458,621 A | 7/1984 | De Clifford |
| 4,955,653 A * | 9/1990 | Beals ............... B25J 15/028 294/119.1 |

(Continued)

FOREIGN PATENT DOCUMENTS

| WO | 2009026002 | 2/2009 |
| WO | 2010025283 | 3/2010 |

(Continued)

OTHER PUBLICATIONS

Michael, Katina, and Luke McCathie. "The pros and cons of RFID in supply chain management." International Conference on Mobile Business (ICMB'05). IEEE, 2005.*

(Continued)

*Primary Examiner* — Isam A Alsomiri
*Assistant Examiner* — Jonathan D Armstrong
(74) *Attorney, Agent, or Firm* — Gottlieb, Rackman & Reisman, PC

(57) ABSTRACT

A method and apparatus for handling of sensor capsules and their inner components during deployment and retrieval of a seismic cable into the sea by a vessel where the seismic cable includes seismic node casings to contain the sensor capsules when the seismic cable is in the sea. The method includes the following steps: withdrawing a sensor capsule from a sensor capsule storage; withdrawing a battery unit from a battery unit storage; withdrawing a control unit from a docking station; combining the control unit and battery unit into a control/battery unit; inserting the control/battery unit into the sensor capsule and closing the sensor capsule; and loading the sensor capsule into a seismic node casing.

12 Claims, 5 Drawing Sheets

(58) Field of Classification Search
USPC .......................................................... 367/15
See application file for complete search history.

(56) References Cited

U.S. PATENT DOCUMENTS

| | | | | |
|---|---|---|---|---|
| 6,034,923 | A * | 3/2000 | Wooters | G01V 1/201 181/110 |
| 7,883,292 | B2 | 2/2011 | Thompson et al. | |
| 8,947,980 | B2 * | 2/2015 | Woo | G01V 1/183 156/293 |
| 8,976,627 | B2 * | 3/2015 | Woo | H04R 9/02 336/208 |
| 9,297,916 | B2 * | 3/2016 | Woo | G01V 1/182 |
| 9,448,311 | B2 * | 9/2016 | Maxwell | G01V 1/38 |
| 9,470,808 | B2 * | 10/2016 | Woo | G01V 1/183 |
| 2002/0110048 | A1 * | 8/2002 | Vandenbroucke | G01V 1/3852 367/24 |
| 2005/0052951 | A1 | 3/2005 | Ray et al. | |
| 2005/0098377 | A1 * | 5/2005 | Bary | G01V 1/38 181/112 |
| 2001/0155814 | | 7/2005 | Bath et al. | |
| 2005/0270901 | A1 * | 12/2005 | Swanson | G01V 1/38 367/15 |
| 2008/0080318 | A1 * | 4/2008 | Maxwell | G01V 1/16 367/131 |
| 2008/0144442 | A1 * | 6/2008 | Combee | G01V 1/22 367/131 |
| 2010/0074048 | A1 * | 3/2010 | Furuhaug | G01V 1/3843 367/15 |
| 2010/0195435 | A1 * | 8/2010 | Berland | G01V 1/201 367/20 |
| 2011/0216625 | A1 * | 9/2011 | Manin | G01V 1/38 367/15 |
| 2014/0078861 | A1 * | 3/2014 | Tamanaja | G01V 1/3852 367/16 |
| 2014/0211589 | A1 * | 7/2014 | Maxwell | G01V 1/38 367/15 |

FOREIGN PATENT DOCUMENTS

| | | |
|---|---|---|
| WO | 2011139159 | 11/2011 |
| WO | 2012118477 | 9/2012 |

OTHER PUBLICATIONS

Written Opinion of the International Searching Authority dated Jun. 23, 2014 for PCT/NO2014/050008.
International Search Report dated Jun. 23, 2014 for PCT/NO2014/050008.
Search Report for priority Norwegian Patent Application No. 20130680 dated Nov. 25, 2013.

* cited by examiner

METHODS AND APPARATUS FOR HANDLING OF SENSOR CAPSULES

This application is a U.S. National Phase of International Application No. PCT/NO2014/050008, filed Jan. 16, 2014, which in turn claims priority to Norwegian Patent Application No. 20130680, filed May 14, 2013, the contents of both which are hereby incorporated by reference in their entirety as part of the present disclosure.

INTRODUCTION

The present invention relates to the field of marine seismic exploration. More particularly, the invention relates to a method for handling of sensor capsules and their inner components during deployment of a seismic cable into the sea by a vessel, the seismic cable comprises seismic node casings for containing the sensor capsules when the seismic cable is in the sea. The invention also relates to a method for handling of sensor capsules and their inner components during retrieval of a seismic cable from the sea. The invention also relates to apparatuses for use in the methods, and a control/battery unit to be included in a sensor capsule.

BACKGROUND

In marine seismic exploration a seismic source emits sound waves which are reflected/refracted by interfaces between layers of the subsurface with different elastic properties. The amplitudes and arrival times of the returned sound waves are recorded by seismic sensors. Two main techniques are used to record the returned sound wave signals; one is by using hydrophone cables that are towed behind a vessel near the sea level, the other is to deploy seismic nodes containing the sensors at the ocean bottom. This invention relates to the latter technique.

After the seismic data has been recorded by the seismic nodes at the sea bottom, the seismic nodes are retrieved for transferring the seismic data to a data storage unit.

U.S. Pat. No. 7,883,292 describes a method and apparatus for storing, deploying and retrieving a plurality of seismic devices. The apparatus includes a ramp device coupled to a portion of a trailing end of a vessel, a cable handling device positioned between the ramp device and a leading end of the vessel to define a cable path across the ramp device, and at least one conveyor system having a first end located adjacent the ramp device and a second end extending toward the leading end of the vessel.

U.S. Pat. No. 4,458,621 describes a marine life harvesting method and apparatus in which a vessel has a marine life capturing device. A conveyor moves marine life from the marine life capturing device to a processing station.

WO 2011139159 describes a method for deployment of an ocean bottom seismic cable comprising seismic node casings containing autonomous sensor capsules, the method comprises deploying the ocean bottom seismic cable at the sea bed from at least one reel arrangement on a vessel, and automatically or manually inserting the autonomous sensor capsules into the seismic node casings before the seismic node casings are deployed into the sea. The autonomous sensor capsules may be inserted into the node casings by an industrial robot. It is also described a method for recovery of an ocean bottom seismic cable comprising seismic node casings containing autonomous sensor capsules, the method comprises spooling the ocean bottom seismic cable onto at least one reel arrangement, manually or automatically removing the autonomous sensor capsules from the seismic node casings during spooling, and retrieving the seismic data from the autonomous sensor capsules. The sensor capsule is placed in a docking station for unloading of data and recharging of batteries. This may be done by removing a battery and data storage unit from the sensor capsule and place it in a docking station, which may be managed by an industrial robot. The battery and data storage unit may further comprise a removable unit, comprising a real time clock, a CPU board and a memory. The removable unit may be docked by an industrial robot.

The purpose of the invention is to provide more refined technical solutions for the sensor capsules and their inner components and their handling.

SUMMARY OF THE INVENTION

The invention provides a control/battery unit to be included in a sensor capsule to be contained in a seismic node casing forming part of a seismic cable.

The seismic node casings may be interconnected by stress member sections, thereby forming the seismic cable, as described in WO 2011139159. The seismic node casings may have integrated flexible joints allowing bending of the node casings during spooling on reels.

The sensor capsules contain sensors, typically geophones and associated analog and digital electronics for obtaining seismic signals. The sensor capsules may also contain hydrophones, accelerometers and other sensors, e.g. temperature sensors.

According to the invention the control/battery unit comprises a control unit and a battery unit which can be combined for insertion into the sensor capsule, and which can be separated for separate handling and storage outside the sensor capsule.

The control unit comprises an oscillator clock, memory, input/output means, a processor for executing program code and other components necessary to store seismic signals.

The invention also provides a method for handling of sensor capsules and their inner components during deployment of a seismic cable into the sea by a vessel, the seismic cable comprises seismic node casings for containing the sensor capsules when the seismic cable is in the sea.

The deployment of the seismic cable may be done by unspooling the seismic cable from a reel, in a known manner.

The method comprises the following steps:
i) withdrawing a sensor capsule from a sensor capsule storage;
ii) withdrawing a battery unit from a battery unit storage;
iii) withdrawing a control unit from a docking station;
iv) combining the control unit and battery unit into a control/battery unit;
v) inserting the control/battery unit into the sensor capsule and closing the sensor capsule; and
vi) loading the sensor capsule into a seismic node casing.

Step vi) is known from WO 2011139159. This step is thus not novel, but is included in the method according to the invention to define an integrated method.

Preferably, to provide a simple and reliable way of carrying out steps iii) and iv), these steps are done by combining the control unit and battery unit into the control/battery unit while the control unit is in the docking station, and then withdrawing the control/battery unit from the docking station. Step iv) is then carried out before step iii).

There may be mechanisms for connecting/disconnecting the control unit to the docking station and for connecting/disconnecting the battery unit to the control unit. The mechanisms may be threads. Threads forming a mechanism may have a different friction from threads forming another mechanism, causing the mechanism with the threads with the lowest friction to be activated first during a turning movement. The mechanisms may also be bayonet locks, e.g. a bayonet lock that locks the control unit to the docking station and another bayonet lock that locks the battery unit to the control unit. The two bayonet locks may function differently, to enable a controlled locking and release of a particular bayonet lock by applying a specific combination of a turning movement and longitudinal movement to the battery unit. The mechanisms may also comprise locking springs, clips, friction fittings or other mechanisms, or be formed by a combination of said mechanisms.

The combining of the control unit and battery unit into the control/battery unit may be done by applying a longitudinal movement and/or a turning movement to the battery unit, the movement(s) activate(s) mechanisms that connect the battery unit to the control unit and disconnect the control unit from the docking station.

Preferably the longitudinal movement activates mechanisms that connect the battery unit to the control unit. Further, preferably the turning movement activates mechanisms that disconnect the control unit from the docking station. Further, preferably the longitudinal movement is applied before the turning movement.

After combining the control unit and battery unit into the control/battery unit, electric power from the battery unit to the control unit is switched on. Preferably electric power from the docking station to the control unit is switched off simultaneously or later. This has the effect that the control unit with the oscillator clock is powered all the time, which ensures a continuous counting of time by the oscillator clock.

Preferably the insertion of the control/battery unit into the sensor capsule and closing the sensor capsule is accompanied by injecting gas into the sensor capsule, to prevent condensation inside the sensor capsule. The gas may be dry air or nitrogen or any gas with similar properties.

The invention also provides a method for handling of sensor capsules and their inner components during retrieval of a seismic cable from the sea by a vessel. The retrieval of the seismic cable may be done by spooling the seismic cable onto a reel, in a known manner.

The method comprises the following steps:
i) unloading a sensor capsule from a seismic node casing;
ii) opening the sensor capsule and removing a control/battery unit from the sensor capsule;
iii) dividing the control/battery unit into a control unit and a battery unit;
iv) placing the control unit in a docking station for communication with a control system;
v) placing the battery unit in a battery unit storage; and
vi) placing the sensor capsule in a sensor capsule storage.

Step i) is known from WO 2011139159. This step is thus not novel, but is included in the method according to the invention to define an integrated method.

After placing the control unit in the docking station, data may be unloaded from the control unit to the control system. The control system is in this context a computer system on the vessel. The control unit may be tested, the processor may be reprogrammed and the oscillator clock may be calibrated and synchronized.

After placing the battery unit in the battery unit storage, the battery may be recharged or replaced.

Preferably, to provide a simple and reliable way of carrying out steps iii) and iv), these steps are done by placing the control/battery unit in the docking station and dividing the control/battery unit into the control unit and battery unit while the control/battery unit is in the docking station. Step iv) is then carried out before step iii).

As explained above, there may be mechanisms for connecting/disconnecting the control unit to the docking station and for connecting/disconnecting the battery unit to the control unit.

The dividing of the control/battery unit into the control unit and battery unit may be done by applying a turning movement and/or a longitudinal movement to the battery unit, the movement(s) activate(s) mechanisms that connect the control unit to the docking station and disconnect the battery unit from the control unit.

Preferably the turning movement activates mechanisms that connect the control unit to the docking station. Further, preferably the longitudinal movement activates mechanisms that disconnect the battery unit from the control unit. Further, preferably the turning movement is applied before the longitudinal movement.

After placing the control unit in the docking station, electric power from the docking station to the control unit is switched on. Preferably electric power from the battery unit to the control unit is switched off simultaneously or later. This has the effect that the control unit with the oscillator clock is powered all the time, which ensures a continuous counting of time by the oscillator clock.

Preferably the opening of the sensor capsule and removing the control/battery unit from the sensor capsule is accompanied by blowing gas towards the sensor capsule and/or the control/battery unit, to remove water and moisture. The gas may be dry air.

Preferably the control unit comprises an electronic ID, and it is also preferred that the battery unit comprises an electronic ID. Preferably the control unit comprises electronics for registering the electronic ID of the battery unit, and the electronics preferably also registers an electronic ID of the sensor capsule. This enables registering which control unit and battery unit that is contained in a particular sensor capsule when the components are assembled. The information is transferred to the control system during the docking of the control unit, and enables the control system to keep track of the identity of the control units, battery units and sensor capsules in the various positions of the docking station, battery unit storage and sensor capsule storage, respectively. If reading the seismic data reveals that a component is faulty, this component may be serviced or replaced.

The methods of the invention may be carried out entirely automatic, thus enabling handling the sensor capsules without risk of personal injury. The invention is not dependent upon performing the steps in any particular order.

The invention also provides an apparatus for handling of sensor capsules and their inner components during deployment of a seismic cable into the sea by a vessel. According to the invention the apparatus comprises at least one robot for performing steps i) to v) of the method for deployment of the seismic cable. Step vi) may be carried out according to WO 2011139159.

The invention also provides an apparatus for handling of sensor capsules and their inner components during retrieval of a seismic cable from the sea by a vessel. According to the invention the apparatus comprises at least one robot for performing steps ii) to vi) of the method for retrieval of the seismic cable. Step i) may be carried out according to WO 2011139159.

"Robot" shall be understood in its broadest meaning, i.e. any device performing a controlled task, and may comprise mechanical means like grippers, a processor for executing program code, electric motors and actuators, sensors, etc. In addition to the robot the apparatuses of the invention may also comprise conveyors, supports, racks, rails, etc. which are required for performing the methods of the invention.

The turning movement discussed above when carrying out the methods of the invention may be applied by a gripper of the robot. Preferably the battery unit comprises orienting features for engagement with corresponding orienting features of the gripper. Such orienting features may be of any kind, e.g. polygonal external shapes. As an example, a portion of the battery unit facing the gripper may be square or hexagonal. Alternatively this portion may have grooves, projections or holes. The purpose of the orienting features may be guiding a gripper during its gripping, orienting the battery unit relative to the gripper and enabling a firm grip of the battery unit by the gripper.

The invention provides an automated way to handle sensor capsules and their inner components in a limited space on a vessel, and enables separate storing of the sensor capsules and battery units, while the control units are placed in docking stations. Further this enables separate testing, checking and possibly cleaning, maintenance and replacement of each control unit, battery unit and sensor capsule in an efficient and reliable way.

BRIEF DESCRIPTION OF DRAWINGS

An embodiment of the invention will now be described with reference to the accompanying drawings, where.

DETAILED DESCRIPTION

Figure 1:
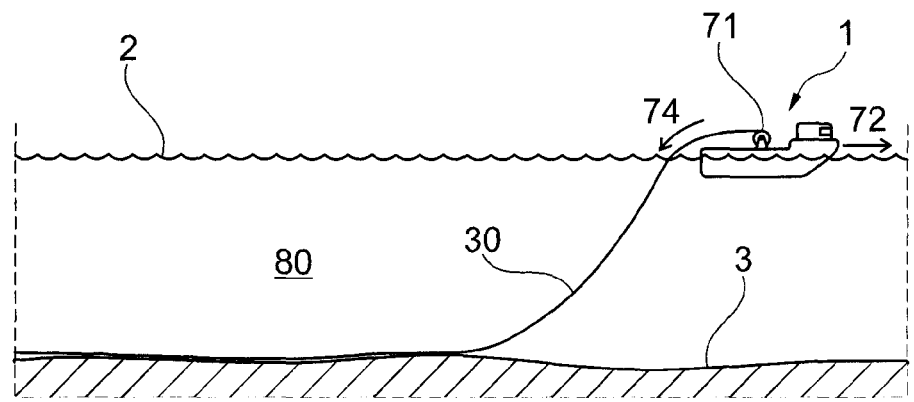
FIG. 1 illustrates a vessel deploying a seismic cable at the ocean bottom.

The same reference numerals are used for the same or similar features in all the drawings and throughout the description.

Before explaining the invention, the context of its use will be explained.

FIG. 1 illustrates a seismic vessel 1 floating in the sea 80 at the sea surface 2. The vessel moves in a direction 72 and deploys a seismic cable 30 at the ocean bottom 3. The seismic cable 30 is unspooled from a reel 71 and deployed over the stern of the vessel in direction 74.

Figure 2:
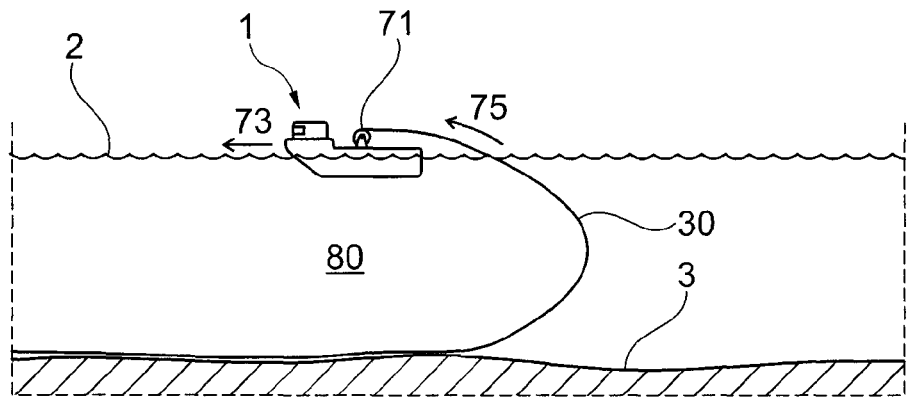
FIG. 2 illustrates the vessel retrieving the seismic cable from the ocean bottom.

FIG. 2 illustrates the vessel 1 in FIG. 1 moving in a direction 73 and retrieving the seismic cable 30 from the ocean bottom 3. The seismic cable 30 is retrieved over the stern of the vessel 1 and spooled onto the reel 21 in direction 75.

The seismic cable may be deployed and retrieved other places on the vessel, e.g. over the bow or side, and the invention is not limited to deploying/retrieving of the seismic cable at any particular place on the vessel.

Figure 3:
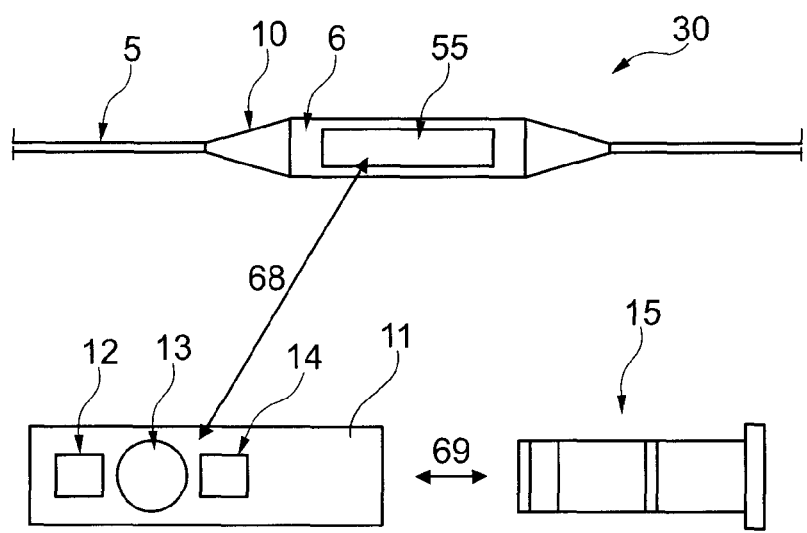
FIG. 3 illustrates a section of the seismic cable, a sensor capsule and a control/battery unit.

FIG. 3 illustrates a section of the seismic cable 30 of a kind used for the invention. The cable comprises autonomous seismic nodes casings 6 interconnected by stress members 5, in this embodiment formed by steel wire.

The seismic node casing 6 comprises an inner space 55 for locating a removable autonomous sensor capsule 11, illustrated at the lower left of FIG. 3. Loading and unloading of the sensor capsule 11 into/out of the seismic node casing 6 is schematically illustrated by a double arrow 68. The illustrated sensor capsule 11 comprises a geophone 14, a hydrophone 13 and an analog and digital electronic recording module 12. Acoustic decoupling arrangements 10 between the node casings 6 and the stress members 5 stop or reduce propagation of acoustic signals and noise between the node casings 6.

FIG. 3 also illustrates a removable control/battery unit 15 to be included in the sensor capsule 11. A double arrow 69 schematically illustrates insertion and removal of the control/battery unit 15 into/out of the sensor capsule 11.

Figure 4:
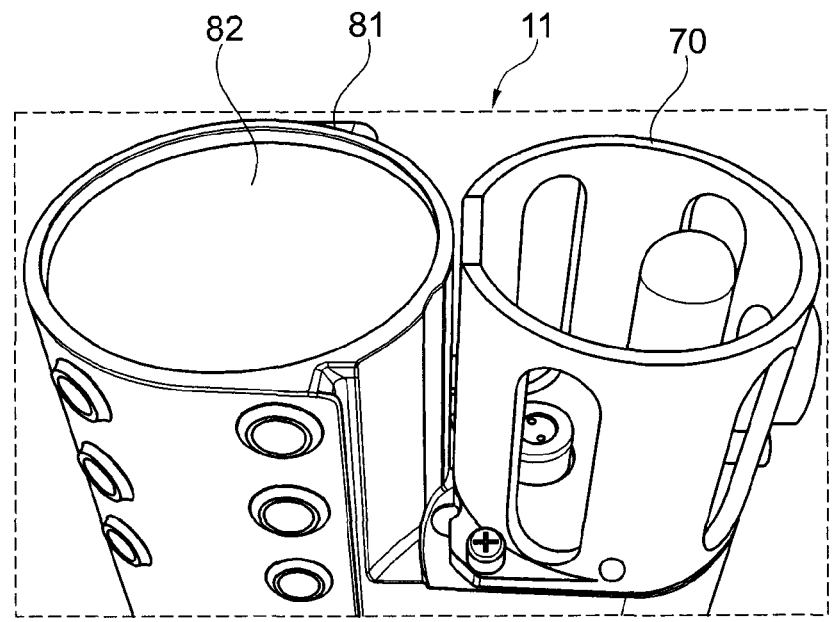
FIG. 4 illustrates a portion of the sensor capsule in closer detail.

FIG. 4 illustrates a portion of the sensor capsule 11 in closer detail. The sensor capsule 11 comprises a sensor section 70 containing the geophone 14, hydrophone 13 and the analog and digital recording module 12, and a control/battery section 81 with an inner space 82 for containing the control/battery unit 15.

Figure 5A:
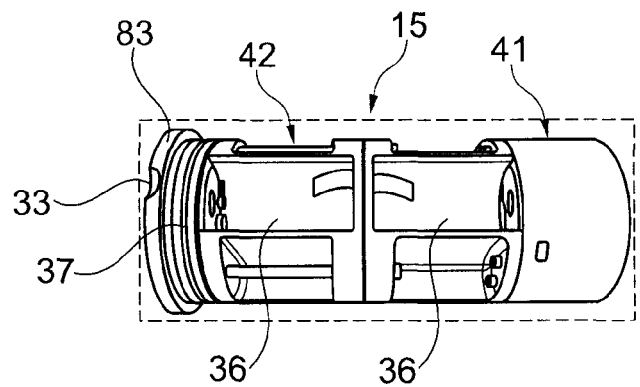
FIG. 5A illustrates the control/battery unit comprising a control unit and a battery unit.

FIG. 5A illustrates the control/battery unit 15 comprising a control unit 41 and a battery unit 42. Empty battery rooms 36 of the battery unit 42 allow insertion of not illustrated batteries. A lid 83 closes the inner space 82 of the control battery section 81 of the sensor capsule 11 when the control/battery unit 15 is contained therein. An O-ring 37 ensures tightness. The lid 83 of the battery unit 42 comprises orienting features, formed by positioning grooves 33 along the circumference, for engagement with corresponding gripping and orienting features of a gripper.

Figure 5B:
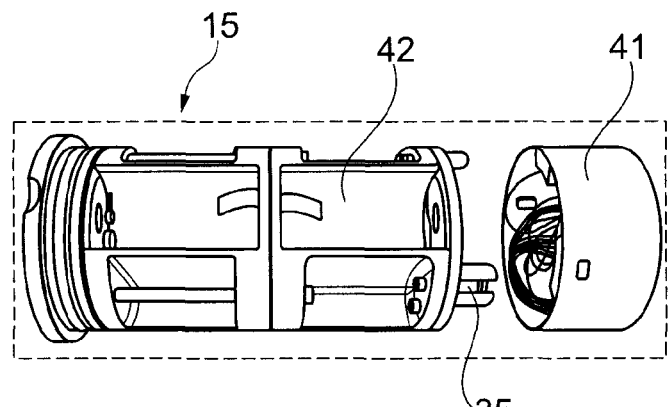
FIG. 5B illustrates the control/battery unit with the control unit and battery unit separated.

FIG. 5B illustrates the control/battery unit 15 with the control unit 41 and battery unit 42 separated. Clips 35 locks the control unit 41 to the battery unit 42 when they are combined.

The control unit 41 comprises a processor for executing program code, an oscillator clock, a memory, input/output means, internal communication means and other components necessary to control the sensor capsule 11, control unit 41 and battery unit 42, and registers and stores seismic signals from the sensor capsule 11.

Figure 6:
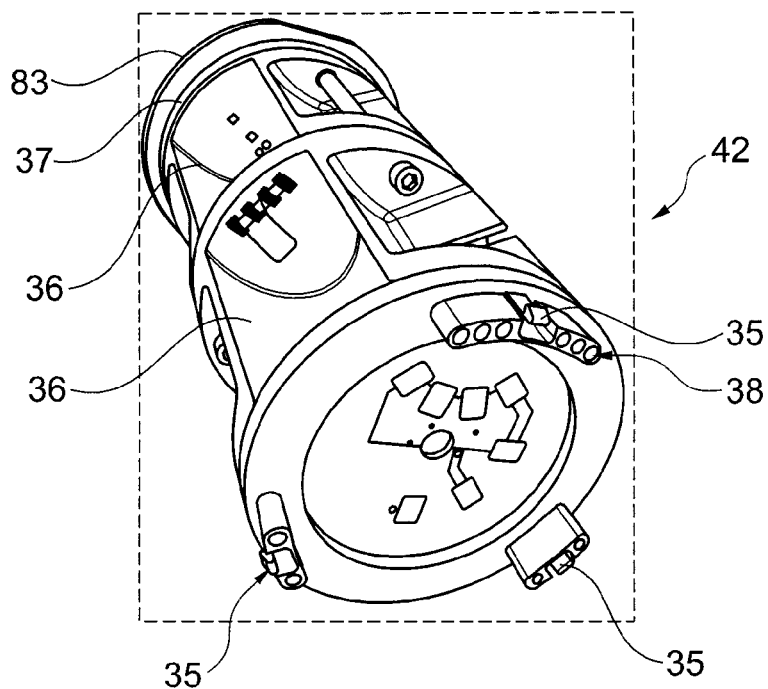
FIG. 6 illustrates the battery unit.

FIG. 6 illustrates the battery unit 42 separated from the control unit, illustrating three clips 35 for locking to the control unit 41, and electrical connectors 38 for electric coupling to the control unit.

Figure 7:
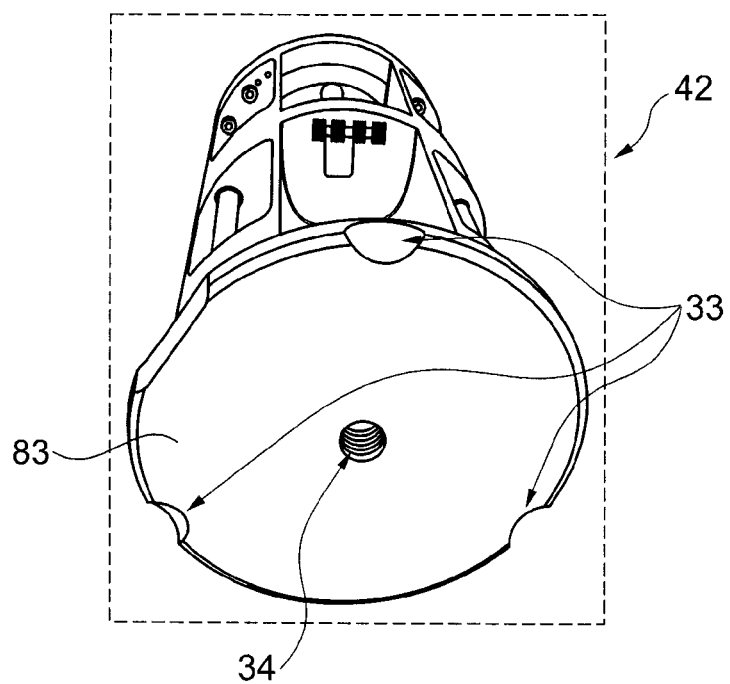
FIG. 7 illustrates the battery unit with its lid.

FIG. 7 illustrates the battery unit 42 with the lid 83 in front, and illustrates the positioning grooves 33 along the circumference. It is also illustrated a threaded recess 34 used for manually opening the lid 83.

Figure 8:
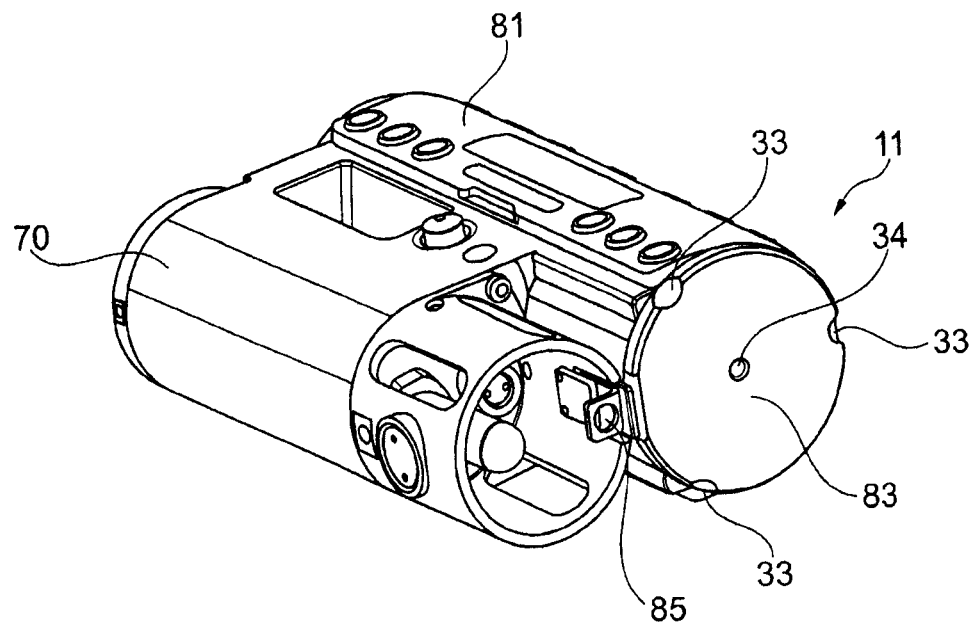
FIG. 8 illustrates the sensor capsule.

FIG. 8 illustrates the sensor capsule 11 with the control/battery unit 15 inserted in the control/battery section 81. The control/battery section 81 is closed by the lid 83. A clamp 85 holds the lid in place.

Figure 9:
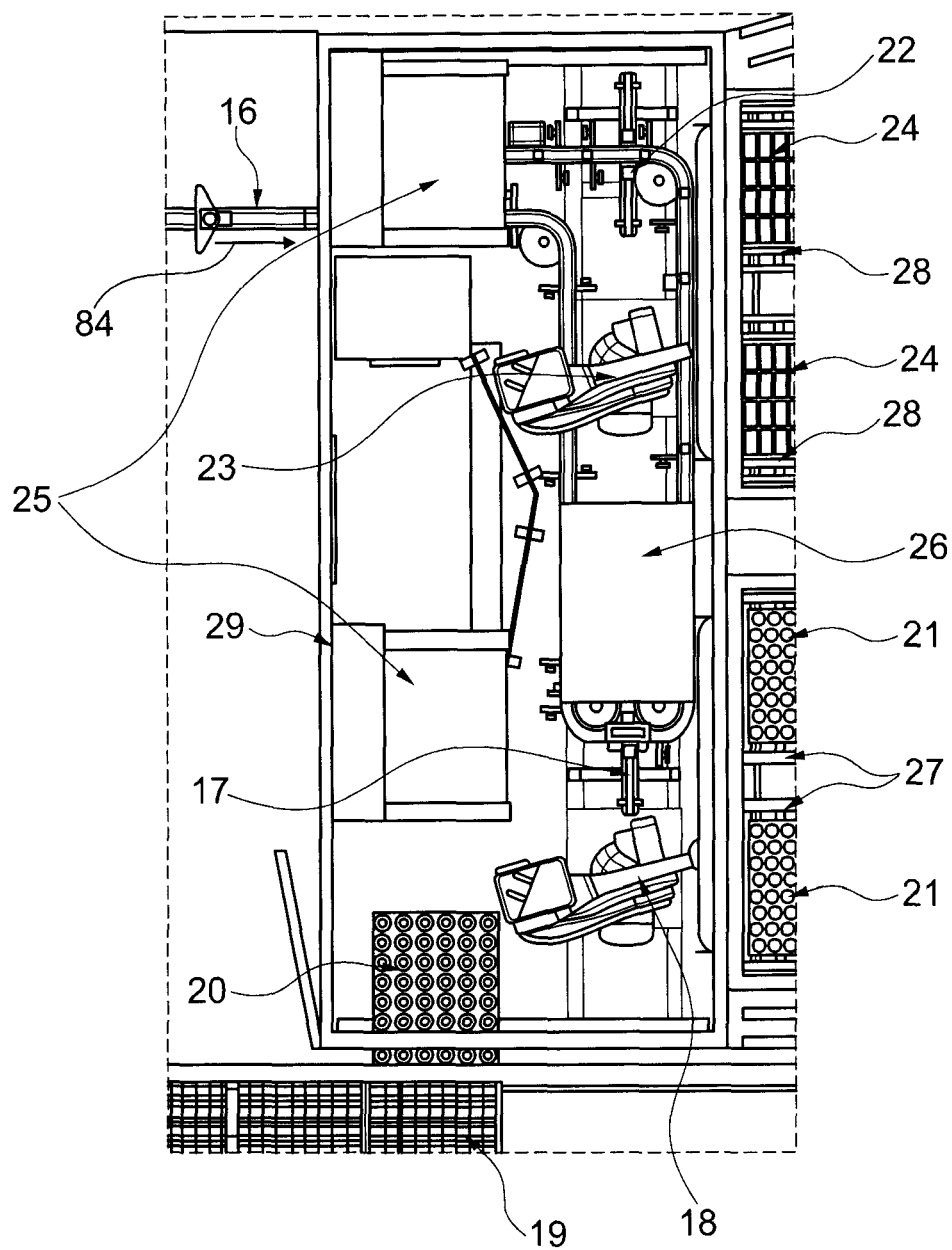
FIG. 9 illustrates an apparatus according to the invention.

FIG. 9 illustrates an apparatus according to the invention, for performing the steps of the methods of the invention. However, as mentioned in the general part of the description, the step of loading the sensor capsule into the seismic node casing during deployment of the seismic cable and the step of unloading the sensor capsule from the seismic node casing during retrieval of the seismic cable are performed by other apparatuses.

Figure 10:
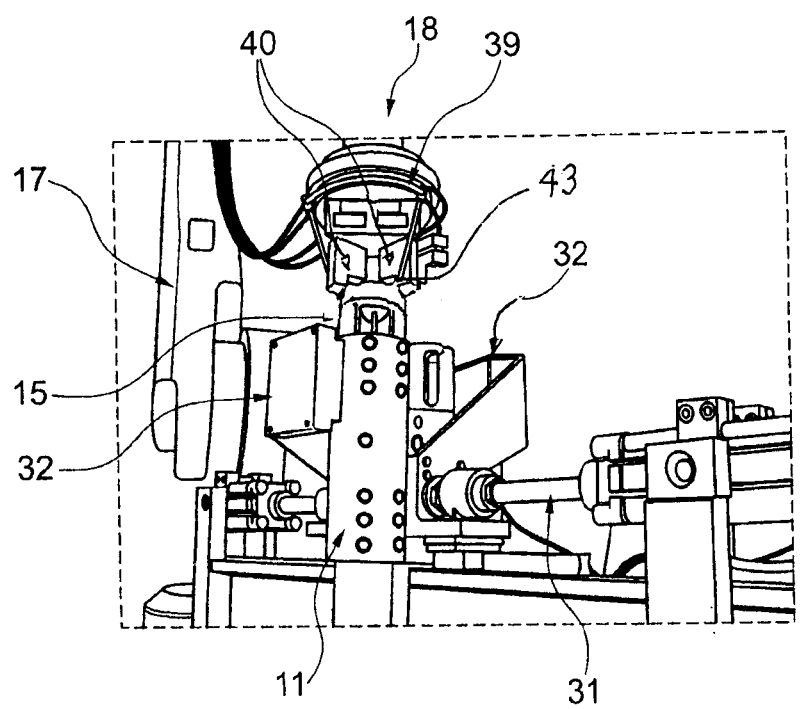
FIG. 10 illustrates a robot and a fixation unit.

During retrieval of an ocean bottom seismic cable, the sensor capsules are, after they have been taken out from the node casing in the ocean bottom cable, transported to the sensor capsule handling system illustrated in FIG. 9. The sensor capsules 11 are one by one placed on a conveyor 16 and transported in the direction shown by arrow 84 to a first position where the sensor capsule 11 is temporary held by a fixation unit 17. The fixation unit 17 is illustrated in FIG. 10, and comprises fixation means 31 and fixation claws 32 that hold the sensor capsule 11 with the control/battery unit 15. FIG. 10 also illustrates a first robot 18 with a gripper formed by fastening claws 40. The first robot 18 releases the clamp 85 on the sensor capsule 11 and simultaneously grab and lift the lid 83 of the battery unit 42, and removes the control/battery unit 15 from the sensor capsule 11. The tool that grabs the battery unit 42 has a hose 39 for compressed dry air supplied from one of two air condition units 25, and one or more nozzles 43 that blow turbulent air around the lid 83 when it is opened, such that no remaining humidity or water droplets remain between the O-ring 37 on the lid 83 and/or the surrounding surfaces of the sensor capsule 11. The control unit 41 is attached to the bottom end of the battery unit 42 by three clips 35, and together the control unit and the battery unit form the control/battery unit 15.

Then the first robot 18 moves the control/battery unit 15 to a docking station 19 and places the control unit 41 into one of the docking sockets in a drawer 20 with docking sockets. This is done by inserting the control/battery unit 15 with the control unit 41 in front into the docking socket and applying a turning movement to the battery unit, causing corresponding threads or a similar mechanism to connect the control unit 41 to the docking socket. Then the first robot 18 applies a longitudinal movement to the battery unit, causing a release of the clips 35, such that the control unit 41 is released from the battery unit 42. The first robot 18 then moves the battery unit 42 to a battery unit storage pallet 21 and places it in a free location. The control unit 41, when docked and released from the battery unit 42, immediately switches on to local electric power from the docking station 19, i.e. electric power from the vessel's onboard electric system, and the battery power is switched off.

The sensor capsule 11 is then released from the fixation unit 17 and moves along the conveyer 16 to a second position where it is held by a fixation unit 22, and a second robot 23 grabs it and places it in a sensor capsule storage pallet 24.

The above procedure is then repeated for the remaining sensor capsules 11 that are placed on the conveyer 16 until all sensor capsules 11 and battery units 42 are stored in their respective storage pallets, and all control units 41 are docked in their respective docking sockets.

The sensor capsule storage pallets 24 and the battery units storage pallets 21 are moveable on tracks. When one storage pallet is full the storage pallet is automatically moved and replaced by another empty storage pallet.

FIG. 9 also illustrates a table 26 for pallets, storage containers 27 for battery units, storage containers 28 for sensor capsules and a wall 29.

The docking sockets are mounted on drawers 20 which are stored in cabinets 19. After docking, the control units 41 transfer their recorded data to the control system.

During deployment of the cable the second robot 23 grabs a first sensor capsule 11 from the sensor capsule storage pallet 24 and places it on the conveyer 16. The sensor capsule 11 is moved to the first position and is held by the fixation unit 17 at the first robot 18. The first robot 18 first grabs a battery unit 42 from the battery unit storage pallet 21 and moves it to the docking station 19 where it is attached to a corresponding control unit 41 by a longitudinal movement that makes the clips 35 connect the control unit and the battery unit into the control/battery unit 15. A turning movement then releases corresponding threads of the control unit 41 and the docking socket, thereby releasing the control unit 41 from the docking socket. The supply of electric power to the control unit 41 is then switched from the onboard electric system to the battery unit 42. The first robot 18 then moves the control/battery unit 15 to a position above the sensor capsule 11 and inserts it into the sensor capsule. The clamp 85 is held back and locked by the first robot 18 such that the lid 83 is secured. During the process of inserting the control/battery unit 42, the first robot 18 may with one or more nozzles (43) inject a specified small amount of nitrogen or a similar gas into the sensor capsule 11 to prevent later condensation inside the sensor capsule during operation on the seafloor or during retrieval. The sensor capsule 11 will automatically start and perform a self test of the electronic hardware and software and also perform a sensor test. A flashing green led indicator on the sensor capsule confirms if the sensor capsule 11 is correctly functioning. If it fails the self test a red led light will flash. Self test data may also be stored in the memory in the control unit for later retrieval and inspection.

The sensor capsule 11 is then moved to another place for loading into a seismic node casing.

Each sensor capsule has a RFID (Radio Frequency Identification) tag that provides them with a unique identity. In addition each sensor capsule, control unit and battery unit have their unique electronic identity. The electronic identities are all logged by the control system for quality control and follow up.

The invention claimed is:

1. A method for handling sensor capsules and inner components of the sensor capsules during deployment of a seismic cable into a sea by a vessel, the seismic cable comprising seismic node casings containing the sensor capsules when the seismic cable is in the sea, the method comprising the following steps:
   i) withdrawing one of the sensor capsules from a sensor capsule storage;
   ii) withdrawing a battery unit, which includes positioning grooves at an outer circumference thereof, from a battery unit storage;
   iii) withdrawing a control unit, which is entirely separate from the battery unit, from a docking station;
   iv) combining the control unit and battery unit together to form a control/battery unit;
   v) inserting the control/battery unit into the sensor capsule and closing the sensor capsule; and
   vi) loading the sensor capsule into a seismic node casing, wherein steps iii) and iv) are done by combining the control unit and battery unit into the control/battery unit while the control unit is in the docking station and then withdrawing the control/battery unit from the docking station.

2. The method of claim 1, wherein combining the control unit and battery unit into the control/battery unit comprises applying a longitudinal movement and a turning movement to the battery unit, the longitudinal movement activates mechanisms that connect the battery unit to the control unit and the turning movement activates mechanisms that disconnect the control unit from the docking station.

3. The method of claim 1, further comprising the steps of, after combining the control unit and the battery unit into the control/battery unit, switching on electric power from the battery unit to the control unit, and, simultaneously or later, switching off electric power from the docking station to the control unit.

4. The method of claim 1, wherein inserting the control/battery unit into the sensor capsule is accompanied by injecting gas into the sensor capsule to prevent condensation inside the sensor capsule.

5. A method for handling of sensor capsules and inner components of the sensor capsules during retrieval of a seismic cable from a sea by a vessel, the seismic cable comprising seismic node casings containing the sensor capsules when the seismic cable is in the sea, the method comprising the following steps:
   i) unloading a sensor capsule from a seismic node casing;
   ii) opening the sensor capsule and removing a control unit and a battery unit from the sensor capsule;
   iii) placing the control unit and the battery unit in a docking station for communication with a control system;
   iv) separating the battery unit from the control unit such that the battery unit and the control unit are entirely independent of each other upon separation of the battery unit from the control unit;
   v) placing the battery unit, which includes positioning grooves at an outer circumference thereof, in a battery unit storage; and
   vi) placing the sensor capsule in a sensor capsule storage, wherein steps iii) and iv) are done by placing the control/battery unit in the docking station and dividing the control/battery unit into the control unit and battery unit while the control/battery unit is in the docking station.

6. The method of claim 5, wherein dividing the control/battery unit into the control unit and the battery unit comprises applying a turning movement and a longitudinal movement to the battery unit, the turning movement activates mechanisms that connect the control unit to the docking station and the longitudinal movement activates mechanisms that disconnect the battery unit from the control unit.

7. The method of claim 5, further comprising the steps of, after placing the control unit in the docking station, switching on electric power from the docking station to the control unit and, simultaneously or later, switching off electric power from the battery unit to the control unit.

8. The method of claim 5, wherein opening the sensor capsule and removing the control/battery unit from the sensor capsule is accompanied by blowing gas towards the sensor capsule and/or the control/battery unit, to remove water and moisture.

9. An apparatus for handling of sensor capsules and inner components of the sensor capsules during deployment of a seismic cable into a sea by a vessel, the seismic cable comprising seismic node casings for containing the sensor capsules when the seismic cable is in the sea, the apparatus comprising:
   at least one robot for:
   i) withdrawing a sensor capsule from a sensor capsule storage;
   ii) withdrawing a battery unit, which includes positioning grooves at an outer circumference thereof, from a battery unit storage;
   iii) withdrawing a control unit, which is entirely independent of the battery unit, from a docking station;
   iv) combining the control unit and battery unit into a control/battery unit; and
   v) inserting the control/battery unit into the sensor capsule and closing the sensor capsule.

10. The apparatus of claim 9, further comprising a nozzle for injecting gas into the sensor capsule during inserting the control/battery unit into the sensor capsule, to prevent condensation inside the sensor capsule.

11. An apparatus for handling of sensor capsules and inner components of the sensor capsules during retrieval of a seismic cable from a sea by a vessel, the seismic cable comprising seismic node casings containing the sensor capsules when the seismic cable is in the sea, the apparatus comprising:
   at least one robot for:
   i) opening the sensor capsule and removing a control unit and a battery unit from the sensor capsule;
   ii) placing the control unit in a docking station for communication with a control system;
   iii) separating the battery unit from the control unit such that the battery unit and the control unit are entirely independent of each other upon separation of the battery unit from the control unit;
   iv) placing the battery unit, which includes positioning grooves at an outer circumference thereof, in a battery unit storage; and
   v) placing the sensor capsule in a sensor capsule storage.

12. The apparatus of claim 11, further comprising a nozzle for blowing gas towards the sensor capsule and the control/battery unit during opening the sensor capsule and removing the control/battery unit from the sensor capsule to remove water and moisture.

* * * * *